United States Patent
Jeng et al.

(10) Patent No.: US 6,757,577 B1
(45) Date of Patent: Jun. 29, 2004

(54) SYSTEM AND METHOD FOR MANAGING WORK-IN-PROCESS (WIP) WORKLOAD WITHIN A FABRICATION FACILITY

(75) Inventors: Bo-Chan Jeng, Tainan (TW); Wei-Shan Mao, Hsin-Chu (TW); Po-Win Cheng, Kaohsiung (TW)

(73) Assignee: Taiwan Semiconductor Manufacturing Co., Ltd., Hsin Chu (TW)

( * ) Notice: Subject to any disclaimer, the term of this patent is extended or adjusted under 35 U.S.C. 154(b) by 621 days.

(21) Appl. No.: 09/635,481

(22) Filed: Aug. 8, 2000

(51) Int. Cl.⁷ .............................................. G06F 19/00
(52) U.S. Cl. ........................ 700/99; 700/214; 700/103
(58) Field of Search ........................ 700/99–103, 106, 700/121, 213, 214, 218, 108; 705/7–9; 358/486

(56) References Cited

U.S. PATENT DOCUMENTS

| | | | |
|---|---|---|---|
| 5,229,948 A | * 7/1993 | Wei et al. ..................... 700/99 |
| 5,612,886 A | 3/1997 | Weng ..................... 364/468.07 |
| 5,748,478 A | 5/1998 | Pan et al. ............... 364/468.05 |
| 5,818,716 A | 10/1998 | Chin et al. ............. 364/468.06 |
| 5,971,585 A | 10/1999 | Dangat et al. ......... 364/468.08 |
| 6,253,118 B1 | * 6/2001 | Koyama ..................... 700/218 |
| 6,462,842 B1 | * 10/2002 | Hamilton ..................... 358/486 |

* cited by examiner

Primary Examiner—Leo Picard
Assistant Examiner—Steven R. Garland
(74) Attorney, Agent, or Firm—Tung & Associates

(57) ABSTRACT

A system and a method for managing a work-in-process (WIP) workload within a fabrication facility employ sequential processing of the work-in-process (WIP) workload within one each of a minimum of one pre-process tool, a minimum of one buffer tool and a minimum of one post-process tool. A buffer tool tolerance time is calculated predicated upon an available work-in-process (WIP) pre-process rate, an available work-in-process (WIP) buffer capacity and an available work-in-process (WIP) post process rate. The work-in-process (WIP) workload may thus be optimally processed in accord with the buffer tool tolerance time.

14 Claims, 1 Drawing Sheet

SYSTEM AND METHOD FOR MANAGING WORK-IN-PROCESS (WIP) WORKLOAD WITHIN A FABRICATION FACILITY

BACKGROUND OF THE INVENTION

1. Field of the Invention

The present invention relates generally to methods for managing work-in-process (WIP) workload within fabrication facilities. More particularly, the present invention relates to methods for efficiently managing work-in-process (WIP) workload within fabrication facilities.

2. Description of the Related Art

Microelectronic fabrications are formed from microelectronic substrates over which are formed patterned microelectronic conductor layers which are separated by microelectronic dielectric layers.

As microelectronic fabrication integration levels have increased and microelectronic device and patterned microelectronic conductor layer dimensions have decreased, so also has increased the complexity of microelectronic fabrication processing methods and microelectronic fabrication facilities that are employed for fabricating microelectronic fabrications. The increased complexity of microelectronic fabrication processing methods and microelectronic fabrication facilities derives in-part from the length (i.e., total number of process steps) of a typical microelectronic fabrication process description, along with the variety of microelectronic fabrication process tools that is typically employed for fabricating a typical microelectronic fabrication, further in conjunction with the variety of individual microelectronic fabrications (i.e., part numbers) that is typically fabricated within a typical microelectronic fabrication facility.

Further contributing to the complexity of microelectronic fabrication processing methods and microelectronic fabrication facilities is the generally distributed nature of microelectronic fabrication processing methods and microelectronic fabrication facilities, which further allows for various production priorities and dispatching rules when fabricating multiple microelectronic fabrication part numbers within either individual or multiple microelectronic fabrication facilities. Such varied production priorities and dispatching rules in-turn often provide difficulties in management of microelectronic fabrication work-in-process (WIP) workload within microelectronic fabrication facilities.

In light of the foregoing, it is thus desirable in the art of microelectronic fabrication to provide systems and methods for efficiently managing microelectronic fabrication work-in-process (WIP) workload within microelectronic fabrication facilities.

It is towards the foregoing object that the present invention is directed.

Various systems and methods have been disclosed in the arts of manufacturing and fabrication for managing fabrication workload within fabrication facilities, such as but not limited to microelectronic fabrication work-in-process (WIP) workload within microelectronic fabrication facilities.

For example, Weng, in U.S. Pat. No. 5,612,886, discloses a system and a method for managing, with enhanced efficiency, semiconductor integrated circuit microelectronic fabrication work-in-process (WIP) workload within a semiconductor integrated circuit microelectronic fabrication facility. To realize the foregoing object, the system and the method employ a dynamic dispatching algorithm that in turn employs a sorting of semiconductor integrated circuit microelectronic fabrication work-in-process (WIP) workload by both priority and queue time, and further wherein the dynamic dispatching algorithm incorporates both semiconductor substrate release rules and semiconductor integrated circuit microelectronic fabrication dispatch rules.

In addition, Pan et al., in U.S. Pat. No. 5,748,478, disclose a system and a method for optimizing output workload of a fabrication facility, such as but not limited to a semiconductor integrated circuit microelectronic fabrication facility. To realize the foregoing object, the system and the method provide, in general, for determining a work-in-process (WIP) workload inflow within the fabrication facility, for determining a work-in-process (WIP) workload output within the fabrication facility and for calculating a work-in-process (WIP) workload flow intensity within the fabrication facility.

Further, Chin. et al., in U.S. Pat. No. 5,818,716, also disclose a system and a method for managing, with enhanced efficiency. work-in-process (WIP) workload within a fabrication facility, such as but not limited to semiconductor integrated circuit microelectronic fabrication work-in-process (WIP) workload within a semiconductor integrated circuit microelectronic fabrication facility. To realize the foregoing object, the system and the method employ a required turn rate (RTR) algorithm that determines not only a due date and a production priority for the work-in-process (WIP) workload within the fabrication facility, but also provides for local dispatching of the work-in-process (WIP) workload within the fabrication facility.

Finally, Dangat et al., in U.S. Pat. No. 5,971,585, discloses a method for optimizing within a fabrication facility, such as but not limited to a microelectronic fabrication facility, fabrication assets with respect to fabrication demands, such as to determine which fabrication demands may be met, and thus manage a workload within the fabrication facility. To realize the foregoing object, the method employs a best can do (BCD) algorithm for matching the fabrication assets with respect to fabrication demands, where the best can do (BCD) algorithm comprises a forward implode feasible plan solver which may alternatively employ either heuristic decision technology or linear programming decision technology.

Desirable in the art of microelectronic fabrication are additional systems and methods that may be employed for managing microelectronic fabrication work-in-process (WIP) workload within microelectronic fabrication facilities.

It is towards the foregoing object that the present invention is directed.

SUMMARY OF THE INVENTION

A first object of the present invention is to provide a system and a method for managing microelectronic fabrication work-in-process (WIP) workload within a microelectronic fabrication facility.

A second object of the present invention is to provide a system and a method in accord with the first object of the present invention, which system and method are readily commercially implemented.

In accord with the objects of the present invention, there is provided by the present invention a system and a method for managing within a fabrication facility, such as but not limited to a microelectronic fabrication facility, a work-in-process (WIP) workload, such as but not limited to a microelectronic fabrication work-in-process (WIP) workload.

To practice the method of the present invention, there is first provided a fabrication facility comprising: (1) a minimum of one pre-process tool, which in turn provides an available work-in-process (WIP) pre-process rate; (2) a minimum of one buffer tool, which in turn provides an available work-in-process (WIP) buffer capacity; and (3) a minimum of one post-process tool, which in turn provides an available work-in-process (WIP) post-process rate, wherein a work-in-process (WIP) workload within the fabrication facility is sequentially pre-processed within the minimum of one pre-process tool, buffered as needed within the minimum of one buffer tool pending availability of the minimum of one post-process tool, and then post processed within the minimum of one post-process tool. There is then determined for the fabrication facility a buffer tool tolerance time predicated upon the available work-in-process (WIP) pre-process rate, the available work-in-process (WIP) buffer capacity and the available work-in-process (WIP) post process rate, beyond which buffer tool tolerance time the available work-in-process (WIP) buffer capacity is exceeded when operating the fabrication facility. In addition, there is then halted, when operating the fabrication facility, operation of the minimum of one pre-process tool prior to exceeding the buffer tool tolerance time.

The method of the present invention contemplates a system, and in particular a computer implemented system, which may employ the method of the present invention.

The present invention provides a system and a method for managing within a fabrication facility, such as but not limited to a microelectronic fabrication facility, a work-in-process (WIP) workload, such as but not limited to a microelectronic fabrication work-in-process (WIP) workload. The system of the present invention and the method of the present invention realize the foregoing object at least in part by: (1) determining with respect to a fabrication facility comprising: (a) a minimum of one pre-process tool, which in turn provides an available work-in-process (WIP) pre-process rate; (b) a minimum of one buffer tool, which in turn provides an available work-in-process (WIP) buffer capacity; and (c) a minimum of one post-process tool, which in turn provides an available work-in-process (WIP) post-process rate, and further wherein a work in process (WIP) workload within the fabrication facility is sequentially pre-processed within the minimum of one pre-process tool, buffered as needed within the minimum of one buffer tool pending availability of the minimum of one post-process tool, and then post processed within the minimum of one post-process tool, a buffer tool tolerance time; wherein (2) the buffer tool tolerance time is predicated upon the available work-in-process (WIP) pre-process rate, the available work-in-process (WIP) buffer capacity and the available work-in-process (WIP) post process rate, and beyond which buffer tool tolerance time the available work-in-process (WIP) buffer capacity is exceeded when operating the fabrication facility; and further then (3) halting, when operating the fabrication facility, operation of the minimum of one pre-process tool prior to exceeding the buffer tool tolerance time.

The system of the present invention and the method of the present invention are readily commercially implemented. As will be illustrated in greater detail within the Description of the Preferred Embodiments which follows, the present invention employs assets and resources which are either generally employed within the art of microelectronic fabrication or readily adapted to the art of microelectronic fabrication. Since it is thus a specific configuration of assets and resources that at least in part provides the present invention, rather than the existence of assets and resources that provides the present invention, the system of the present invention and the method of the present invention are readily commercially implemented.

BRIEF DESCRIPTION OF THE DRAWING

The objects, features and advantages of the present invention are understood within the context of the Description of the Preferred Embodiments, as set forth below. The Description of the Preferred Embodiments is understood within the context of the accompanying drawings, which form a material part of this disclosure, wherein.

DESCRIPTION OF THE PREFERRED EMBODIMENTS

The present invention provides a system and a method for managing within a fabrication facility, such as but not limited to a microelectronic fabrication facility, a work-in-process (WIP) workload, such as but not limited to a microelectronic fabrication work-in-process (WIP) workload. The system of the present invention and the method of the present invention realize the foregoing object at least in part by: (1) determining with respect to a fabrication facility comprising: (a) a minimum of one pre-process tool, which in turn provides an available work-in-process (WIP) pre-process rate; (b) a minimum of one buffer tool, which in turn provides an available work-in-process (WIP) buffer capacity; and (c) a minimum of one post-process tool, which in turn provides an available work-in-process (WIP) post-process rate, and further wherein a work in process (WIP) workload within the fabrication facility is sequentially pre-processed within the minimum of one pre-process tool, buffered as needed within the minimum of one buffer tool pending availability of the minimum of one post-process tool, and then post processed within the minimum of one post-process tool, a buffer tool tolerance time; wherein (2) the buffer tool tolerance time is predicated upon the available work-in-process (WIP) pre-process rate, the available work-in-process (WIP) buffer capacity and the available work-in-process (WIP) post process rate, and beyond which buffer tool tolerance time the available work-in-process (WIP) buffer capacity is exceeded when operating the fabrication facility; and further then (3) halting, when operating the fabrication facility, operation of the minimum of one pre-process tool prior to exceeding the buffer tool tolerance time.

Although the present invention provides particular value within the context of managing a microelectronic fabrication work-in-process (WIP) workload within a microelectronic fabrication facility, and more particularly within the context of managing a semiconductor integrated circuit microelectronic fabrication work-in-process (WIP) workload within a semiconductor integrated circuit microelectronic fabrication facility, the present invention may also be employed for managing work in process (WIP) workload within fabrication facilities including but not limited to electronic fabrication facilities, microelectronic fabrication facilities, mechanical fabrication facilities and chemical fabrication facilities, particularly under circumstances where the fabrication facilities are nominally distributed fabrication facilities which fabricate multiple part numbers of fabrications while employing multiple process descriptions and multiple fabrication tools with the context of multiple fabrication and production priorities.

Figure 1:
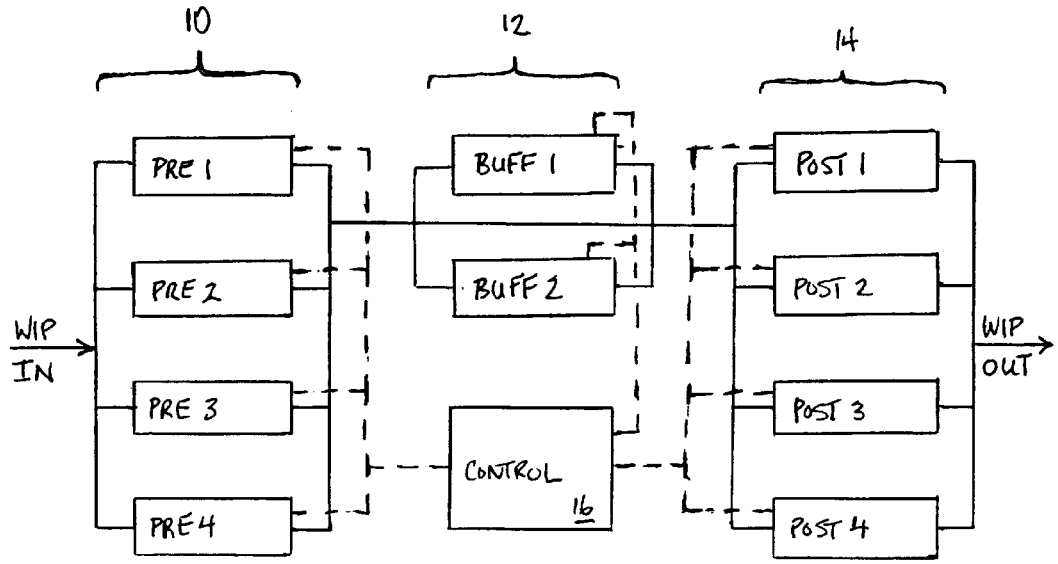
FIG. 1 shows with respect to a fabrication facility a schematic diagram of a pre-process tool/buffer tool/post-process tool multi-tool configuration whose work-in-process (WIP) workload may be managed in accord with the present invention.

Referring now to FIG. 1, there is shown, with respect to a fabrication facility, a schematic diagram of a pre-process tool/buffer tool/post-process tool multi-tool configuration whose work-in-process (WIP) workload may be managed in accord with the present invention.

Shown within FIG. 1 in conjunction with reference numeral 10 is a series of pre-process tools, PRE 1, PRE 2, PRE 3 and PRE 4, which in conjunction with reference numeral 12 are optionally connected to a pair of buffer tools BUFF 1 and BUFF 2, which in turn in conjunction with reference numeral 14 are optionally connected to a series of post-process tools, POST 1, POST 2, POST 3 and POST 4. Although the schematic diagram of FIG. 1 illustrates the series of pre-process tools PRE 1, PRE 2, PRE 3 and PRE 4 connected to the pair of buffer tools BUFF 1 and BUFF 2 in turn connected to the series of post-process tools POST 1, POST 2, POST 3 and POST 4, as is understood by a person skilled in the art, such connection is intended only with respect to process flow considerations and is not intended to require a physical connection between the series of pre-process tools PRE 1, PRE 2, PRE 3 and PRE 4 with the pair of buffer tools BUFF 1 and BUFF 2, or the pair of buffer tools BUFF 1 and BUFF 2 with the series of post-process tools POST 1, POST 2, POST 3 and POST 4, although such a physical connection is not precluded within the present invention and the preferred embodiments of the present invention.

There is also shown within the schematic diagram of FIG. 1 a work-in-process (WIP) workload inflow into the series of pre-process tools PRE 1, PRE 2, PRE 3 and PRE 4 and a work-in-process (WIP) workload outflow from the series of post-processing tools POST 1, POST 2, POST 3 and POST 4. Thus, as is understood by a person skilled in the art, the work-in-process (WIP) workload as is illustrated within the schematic diagram of FIG. 1 is sequentially pre-processed within one of the pre-process tools PRE 1, PRE 2, PRE 3 and PRE 4, then buffered as needed within one of the buffer tools BUFF 1 and BUFF 2 pending availability of one of the post-process tools POST 1, POST 2, POST 3 and POST 4, and then finally post-processed within one of the post-process tools POST 1, POST 2, POST 3 and POST 4. As is further understood by a person skilled in the art, each of the pre-process tools PRE 1, PRE 2, PRE 3 and PRE 4 will have an individual pre-process rate, which in an aggregate and depending upon availability will provide within the fabrication facility an available work-in-process (WIP) pre-process rate. Similarly, each of the post-process tools POST 1, POST 2, POST 3 and POST 4 will have an individual post-process rate, which in an aggregate and depending upon availability will provide within the fabrication facility an available work-in-process (WIP) post process rate. Finally, each of the buffer tools BUFF 1 and BUFF 2 will have a buffer capacity, which in an aggregate and depending upon availability will provide within the fabrication facility an available work-in-process (WIP) buffer capacity.

As is further understood by a person skilled in the art, both the work-in-process (WIP) workload inflow and the work-in-process (WIP) workload outflow as illustrated within the schematic diagram of FIG. 1 are derived from work-in-process (WIP) workload as is consistent with the fabrication facility within which is fabricated the work-in-process (WIP) workload inflow and the work-in-process (WIP) workload outflow as illustrated within the schematic diagram of FIG. 1. For purposes of a semiconductor integrated circuit microelectronic fabrication facility, the work-in-process (WIP) workload inflow and the work-in-process (WIP) workload outflow both typically and preferably comprise semiconductor substrate wafers which have been partially fabricated into semiconductor integrated circuit microelectronic fabrications.

Finally, there is also illustrated within the schematic diagram of FIG. 1 a control unit 16 that is connected, as shown with a series of phantom lines, to each of the series of pre-process tools PRE 1, PRE 2, PRE 3 and PRE 4, the pair of buffer tools BUFF 1 and BUFF 2, and the series of post-process tools POST 1, POST 2, POST 3 and POST 4. Within the present invention and the preferred embodiments of the present invention, the control unit 16 is intended to both receive information, such as but not limited to tool availability information and tool capacity information, from the series of pre-process tools PRE 1, PRE 2, PRE 3 and PRE 4, the pair of buffer tools BUFF 1 and BUFF 2, and the series of post-process tools POST 1, POST 2, POST 3 and POST 4, as well as to control operation and operating parameters of the series of pre-process tools PRE 1, PRE 2, PRE 3 and PRE 4, the pair of buffer tools BUFF 1 and BUFF 2, and the series of post-process tools POST 1, POST 2, POST 3 and POST 4.

Within the present invention and the preferred embodiments of the present invention, the controller 16 will typically and preferably be a computer controller or a computer, although in its most general sense the method of the present invention may also be practiced manually without computer control or computer intervention. Similarly, typically and preferably, the controller, particularly when a computer controller or computer, will have programmed therein an algorithm in accord with the algorithmic flow diagram of FIG. 2, discussed in greater detail as follows.

Figure 2:
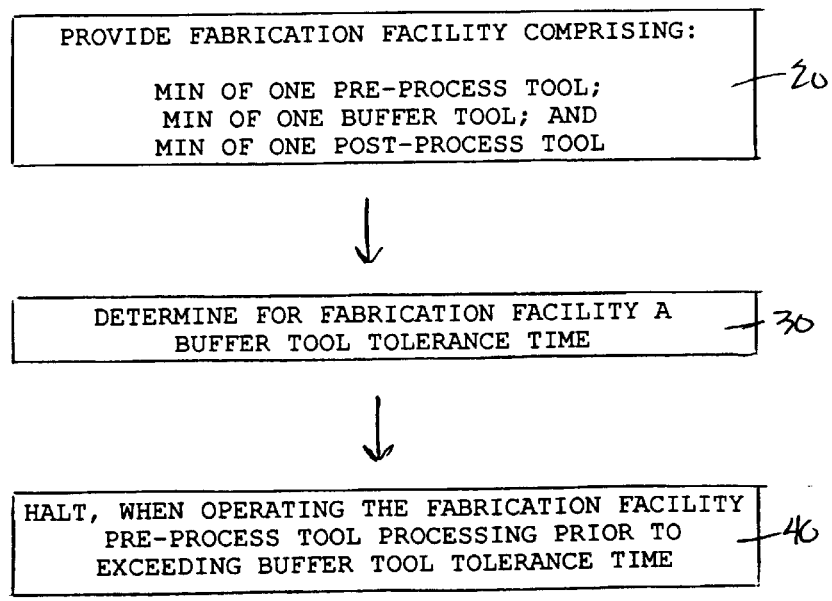
FIG. 2 shows a schematic algorithmic flow diagram that corresponds with the method of the present invention.

Referring now to FIG. 2, there is shown a schematic algorithmic flow diagram that corresponds with the method of the present invention.

As is illustrated within FIG. 2 within the process step that corresponds with reference numeral 20, there is first provided within the present invention a fabrication facility comprising: (1) a minimum of one pre-process tool; (2) a minimum of one buffer tool; and (3) a minimum of one post-process tool. Within the present invention and the preferred embodiments of the present invention, the minimum of one pre-process tool, the minimum of one buffer tool and the minimum of one post-process tool are provided and accounted for, as above, within the context of the corresponding series of pre-process tools PRE 1, PRE 2, PRE 3 and PRE 4, the corresponding pair of buffer tools BUFF 1 and BUFF 2 and the corresponding series of post process tools POST 1, POST 2, POST 3 and POST 4. Further in accord with that which is noted above, the series of pre-process tools PRE 1, PRE 2, PRE 3 and PRE 4 provides in an aggregate, and depending upon availability, an available work-in-process (WIP) pre-process rate. Similarly, and also further in accord with that which is noted above, the series of post-process tools POST 1, POST 2, POST 3 and POST 4 provides in an aggregate, and depending upon availability, an available work-in-process (WIP) post-process rate. Finally, and also in accord with that which is noted above, the pair of buffer tools BUFF 1 and BUFF 2 provides in an aggregate, and depending upon availability, an available work-in-process (WIP) buffer capacity.

Referring again to FIG. 2, there is shown in conjunction with reference numeral 30 the next process step in accord with the method of the present invention.

As is illustrated within the process step which corresponds with reference numeral 30, there is determined for the fabrication facility a buffer tool tolerance time. Further in accord with the method of the present invention and the preferred embodiments of the method of the present invention, the buffer tool tolerance time is determined in accord with equation 1, as follows.

$$BTTT = ABC/(\Sigma i(PREi \times RatePREi) - \Sigma j(POSTj \times RatePOSTj)) \quad (1)$$

where:
BTTC=Buffer Tool Tolerance Time
ABC=Available Buffer Capacity (in work-in-process (WIP) units)
PREi=Designation for Individual Pre-Process Tool
RatePREi=Process Rate for Individual Pre-Process Tool
POSTj=Designation for Individual Post-Process Tool
RatePOSTj=Process Rate for Individual Post-Process Tool
i,j=1, 2, 3 . . .

As is understood by a person skilled in the art, within equation 1 the term $\Sigma i(PREi \times RatePREi)$ corresponds with the available work-in-process (WIP) pre-process rate and the term $(\Sigma j (POSTj \times RatePOSTj)$ corresponds with the available work-in-process (WIP) post-process rate. Similarly, as is also understood by a person skilled in the art, the solution of equation 1 to provide a buffer tool tolerance time will only have value within the context of the present invention when the term $(\Sigma i(PREi \times RatePREi) - \Sigma j (POSTj \times RatePOSTj)$ is of a positive magnitude (i.e., the available work-in-process (WIP) pre-process rate exceeds the available work-in-process (WIP) post-process rate to thus provide a positive value of the buffer tool tolerance time). Under conditions when the term $(\Sigma i(PREi \times RatePREi) - \Sigma j (POSTj \times RatePOSTj)$ is of a negative magnitude (i.e., the available work-in-process (WIP) pre-process rate is lower than the available work-in-process (WIP) post-process rate to thus provide a negative value of the buffer tool tolerance time) the available work-in-process (WIP) buffer capacity will theoretically never be exceeded.

Referring again to FIG. 2, there is shown in conjunction with the process step that corresponds with reference numeral 40 the last process step in accord with the method of the present invention.

As is shown within the process step that corresponds with reference numeral 40, there is halted, when operating the fabrication facility, pre-process tool operation and processing of work-in-process (WIP) workload prior to exceeding the buffer tool tolerance time. From a practical perspective, such halting of pre-process tool operation and processing of work-in-process (WIP) workload prior to exceeding the buffer tool tolerance time is intended as controlling the series of pre-processing tools PRE 1, PRE 2, PRE 3 and PRE 4 such that no work-in-process (WIP) workload is completed therefrom under conditions where the buffer tool tolerance time is exceeded. Also from a practical perspective, and under conditions where the buffer tool tolerance time is positive, it is thus required when operating the fabrication facility to periodically halt, for a sufficiently long time period, operation of a least one of the pre-process tools PRE 1, PRE 2, PRE 3 and PRE 4, such that available work-in-process (WIP) buffer capacity is not exceeded.

Within the present invention and the preferred embodiments of the present invention, the pre-processing tool operation may be halted prior to exceeding the buffer tool tolerance time while employing methods including but not limited to manual methods, which employ manual analysis and control of the fabrication facility tools as illustrated within the schematic diagram of FIG. 1, and computer methods, which employ computer control of the fabrication facility tools as illustrated within the schematic diagram of FIG. 1, such computer methods being further discussed above.

Upon implementing within a fabrication facility having the pre-process tool/buffer tool/post-process tool multi-tool configuration as illustrated within the schematic diagram of FIG. 1 the method of the present invention as disclosed within the schematic algorithmic flow diagram of FIG. 2, there is provided in accord with the present invention a method for managing work-in-process (WIP) workload within a fabrication facility, such as but not limited to microelectronic fabrication work-in-process (WIP) workload within a microelectronic fabrication facility.

The present invention realizes the foregoing object in part by determining with respect to a fabrication facility comprising a minimum of one pre-process tool, a minimum of one buffer tool and a minimum of one post-process tool a buffer tool tolerance time beyond which an available work-in-process (WIP) buffer capacity is exceeded, and then halting, when operating the fabrication facility, pre-process tool processing of work-in-process (WIP) workload, prior to exceeding the buffer tool tolerance time.

EXAMPLES

In order to illustrate operation of the present invention within the context of managing a semiconductor integrated circuit microelectronic fabrication work-in-process (WIP) workload within a semiconductor integrated circuit microelectronic fabrication facility, there is assumed within the context of the following examples that: (1) there exists a series of pre-process tools which comprises a series of chemical mechanical polish (CMP) planarizing apparatus which are employed for planarizing semiconductor integrated circuit microelectronic fabrication work-in-process (WIP) substrates; (2) there exists a series of buffer tools which comprises a series of recirculating deionized water tanks into which are queued a series of chemical mechanical polish (CMP) planarized semiconductor integrated circuit microelectronic fabrication substrates processed within the pre-process tools prior to being post-processed within a series of post-process tools such that a series of chemical mechanical polish (CMP) planarizing slurry residues formed upon the series of chemical mechanical polish (CMP) planarized semiconductor integrated circuit microelectronic fabrication substrates is not allowed to dry and harden; and (3) there exists for the series of post-process tools a series of semiconductor substrate brush scrubbing apparatus that is employed to scrub from the chemical mechanical polish (CMP) planarized semiconductor integrated circuit microelectronic fabrication substrates the series of chemical mechanical polish (CMP) planarizing slurry residues to thus form from the series of chemical mechanical polish (CMP) planarized semiconductor integrated circuit microelectronic fabrication substrates a series of cleaned chemical mechanical polish (CMP) planarized semiconductor integrated circuit microelectronic fabrication substrates.

Within each of the scenarios that follows, it is assumed that each chemical mechanical polish (CMP) planarizing apparatus pre-process tool has a work-in-process (WIP) pre-process rate of 30 semiconductor substrates per hour, each semiconductor substrate brush scrubbing apparatus post-process tool has a work-in-process (WIP) post-process rate of 55 semiconductor substrates per hour and the recirculating deionized water tank buffer tool has an available work-in-process (WIP) buffer capacity of 800 semiconductor substrates.

Within a first scenario, it is assumed that there exist 6 chemical mechanical polish (CMP) planarizing apparatus pre-process tools, 3 semiconductor substrate brush scrubbing apparatus post-process tools and the full available capacity of the recirculating deionized water tank buffer tool. Equation 1, as above, then solves as follows:

BTTT=800/((6×30)−(3×55))=53 hours

Thus, within the first scenario, none of the chemical mechanical polish (CMP) planarizing apparatus pre-process tools should operate beyond a time of about 53 hours without first being halted such as to allow for available work-in-process (WIP) buffer capacity recovery within the recirculating deionized water tank buffer tool.

In a second scenario, it is assumed that there exist 6 chemical mechanical polish (CMP) planarizing apparatus pre-process tools, 2 semiconductor substrate brush scrubbing apparatus post-process tools and the full available recirculating deionized water tank buffer tool. Equation 1, as above, then solves as follows:

BTTT=800/((6×30)−(2×55))=11 hours

Thus, within the second scenario, none of the chemical mechanical polish (CMP) planarizing apparatus pre-process tools should operate beyond a time of about 11 hours without first being halted such as to allow for available work-in-process (WIP) buffer capacity recovery within the recirculating deionized water tank buffer tool.

In a third scenario, it is assumed that there exist 5 chemical mechanical polish (CMP) planarizing apparatus pre-process tools, 3 semiconductor substrate brush scrubbing apparatus post process tools and the full available capacity of the recirculating deionized water tank buffer tool. Equation 1, as above, then solves as follows:

BTTT=800/((5×30)−(3×55))=−53 hours

Since the buffer tool tolerance time calculates as a negative number, it need not be further considered insofar as the calculation within equation 1 of a negative time for the buffer tool tolerance time is indicative that the available chemical mechanical polish (CMP) planarizing apparatus pre-process tool work-in-process (WIP) pre-process rate is less than the available semiconductor substrate brush scrubbing apparatus post-process tool work-in-process (WIP) post-process rate, such in turn that the recirculating deionized water tank work-in-process (WIP) buffer capacity will not be consumed when operating a semiconductor integrated circuit microelectronic fabrication facility.

As is understood by a person skilled in the art, the preferred embodiments and examples of the present invention are illustrative of the present invention rather than limiting of the present invention. Revisions and modifications may be made to materials, tools, fabrication processes and fabrication facilities which are employed within the preferred embodiments and examples of the present invention while still providing a system in accord with the present invention and a method in accord with the present invention, further in accord with the accompanying claims.

What is claimed is:

1. A method for managing within a fabrication facility a work-in-process (WIP) workload comprising:
   providing a fabrication facility comprising:
      a minimum of one pre-process tool, which in turn provides an available work-in-process (WIP) pre-process rate;
      a minimum of one buffer tool, which in turn provides an available work-in-process (WIP) buffer capacity; and
      a minimum of one post-process tool, which in turn provides an available work-in-process (WIP) post-process rate, wherein a work in process (WIP) workload within the fabrication facility is sequentially pre-processed within the minimum of one pre-process tool, buffered as needed within the minimum of one buffer tool pending availability of the minimum of one post-process tool, and then post processed within the minimum of one post-process tool; and
   determining for the fabrication facility a buffer tool tolerance time predicated upon the available work-in-process (WIP) pre-process rate, the available work-in-process (WIP) buffer capacity and the available work-in-process (WIP) post process rate, beyond which buffer tool tolerance time the available work-in-process (WIP) buffer capacity, is exceeded when operating the fabrication facility.

2. The method of claim 1 further comprising:
   operating the fabrication facility; and
   halting, when operating the fabrication facility, operation of the minimum of one pre-process tool prior to exceeding the buffer tool tolerance time.

3. The method of claim 2 wherein the halting of operation of the minimum of one pre-process tool prior to exceeding the buffer tool tolerance time is undertaken employing methods selected from the group consisting of manual methods and computer controlled methods.

4. The method of claim 1 wherein the fabrication facility is selected from the group consisting of electronic fabrication facilities, microelectronic fabrication facilities, mechanical fabrication facilities and chemical fabrication facilities.

5. The method of claim 1 wherein the fabrication facility is a semiconductor integrated circuit microelectronic fabrication facility.

6. The method of claim 1 wherein the determination of the buffer tool tolerance time is undertaken employing methods selected from the group consisting of manual methods and computer controlled methods.

7. A method for managing within a fabrication facility a work-in-process (WIP) workload comprising:
   providing a fabrication facility comprising:
      a minimum of one pre-process tool, which in turn provides an available work-in-process (WIP) pre-process rate;
      a minimum of one buffer tool, which in turn provides an available work-in-process (WIP) buffer capacity; and
      a minimum of one post-process tool, which in turn provides an available work-in-process (WIP) post-process rate, wherein a work in process (WIP) workload within the fabrication facility is sequentially pre-processed within the minimum of one pre-process tool, buffered as needed within the minimum of one buffer tool pending availability of the minimum of one post-process tool, and then post processed within the minimum of one post-process tool; and
   determining for the fabrication facility a buffer tool tolerance time predicated upon the available work-in-process (WIP) pre-process rate, the available work-in-process (WIP) buffer capacity and the available workin-process (WIP) post process rate, beyond which buffer tool tolerance time the available work-in-process (WIP) buffer capacity is exceeded when operating the fabrication facility, wherein the buffer tool tolerance time is determined employing the equation:

$$BTTT=ABC/(\Sigma i(PREi\times RatePREi)-(\Sigma j(POSTj\times RatePOSTj))$$

for positive values of BTTT only, and where:
BTTC=Buffer Tool Tolerance Time
ABC=Available Buffer Capacity (in work-in-process (WIP) units)
PREi=Designation for Individual Pre-Process Tool
RatePREi=Process Rate for Individual Pre-Process Tool
POSTj=Designation for Individual Post-Process Tool
RatePOSTj=Process Rate for Individual Post-Process Tool
i,j=1, 2, 3 . . .

8. A method for managing within a fabrication facility a work-in-process (WIP) workload comprising:
providing a fabrication facility comprising:
a minimum of one chemical mechanical polish (CMP) planarizing pre-process tool, which in turn provides an available work-in-process (WIP) pre-process rate;
a minimum of one recirculating deionized water tank buffer tool, which in turn provides an available work-in-process (WIP) buffer capacity; and
a minimum of one substrate scrubbing apparatus post-process tool, which in turn provides an available work-in-process (WIP) post-process rate, wherein a work in process (WIP) workload within the fabrication facility is sequentially pre-processed within the minimum of one pre-process tool, buffered as needed within the minimum of one buffer tool pending availability of the minimum of one post-process tool, and then post processed within the minimum of one post-process tool; and
determining for the fabrication facility a buffer tool tolerance time predicated upon the available work-in-process (WIP) pre-process rate, the available work-in-process (WIP) buffer capacity and the available work-in-process (WIP) post process rate, beyond which buffer tool tolerance time the available work-in-process (WIP) buffer capacity is exceeded when operating the fabrication facility.

9. A system for managing within a fabrication facility a work-in-process (WIP) workload comprising:
a fabrication facility comprising:
a minimum of one pre-process tool, which in turn provides an available work-in-process (WIP) pre-process rate:
a minimum of one post-process tool, which in turn provides an available work-in-process (WIP) buffer capacity; and
a minimum of one-post-process tool, which in turn provides an available work-in-process (WIP) post-process rate, wherein a work in process (WIP) workload within the fabrication facility is sequentially pre-processed within the minimum of one pre-process tool, buffered as needed within the minimum of one buffer tool pending availability of the minimum of one post-process tool, and then post processed within the minimum of one post-process tool; and
a computing means having programmed therein an algorithm for determining for the fabrication facility a buffer tool tolerance time predicated upon the available work-in-process (WIP) pre-process rate, the available work-in-process (WIP) buffer capacity and the available work-in-process (WIP) post process rate, beyond which buffer tool tolerance time the available work-in-process (WIP) buffer capacity is exceeded when operating the fabrication facility.

10. The system of claim 9 wherein the computing means is also capable of halting, when operating the fabrication facility, operation of the minimum of one pre-process tool prior to exceeding the buffer tool tolerance time.

11. The system of claim 9 wherein the fabrication facility is selected from the group consisting of electronic fabrication facilities, microelectronic fabrication facilities, mechanical fabrication facilities and chemical fabrication facilities.

12. The system of claim 9 wherein the fabrication facility is a semiconductor integrated circuit microelectronic fabrication facility.

13. A system for managing within a fabrication facility work-in-process (WIP) workload comprising:
a fabrication facility comprising:
a minimum of one pre-process tool, which in turn provides an available work-in-process (WIP) pre-process rate;
a minimum of one buffer tool, which in turn provides an available work-in-process (WIP) buffer capacity; and
a minimum of one post-process tool, which in turn provides an available work-in-process (WIP) post-process rate, wherein a work in process (WIP) workload within the fabrication facility is sequentially pre-processed within the minimum of one pre-process tool, buffered as needed within the minimum of one buffer tool pending availability of the minimum of one post-process tool, and then post processed within the minimum of post-process tool; and
a computing means having programmed therein an algorithm for determining for the fabrication facility a buffer tool tolerance time predicated upon the available work-in-process (WIP) pre-process rate, the available work-in-process (WIP) buffer capacity and the available work-in-process (WIP) post process rate, beyond which buffer tool tolerance time the available work-in-process (WIP) buffer capacity is exceeded when operating the fabrication facility, wherein the buffer tool tolerance time is determined employing the equation:

$$BTTT=ABC/(\Sigma i(PREi\times RatePREi)-(\Sigma j(POSTj\times RatePOSTj))$$

for positive values of BTTT only, and where:
BTTC=Buffer Tool Tolerance Time
ABC=Available Buffer Capacity (in work-in-process (WIP) units)
PREi=Designation for Individual Pre-Process Tool
RatePREi=Process Rate for Individual Pre-Process Tool
POSTj=Designation for Individual Post-Process Tool
RatePOSTj=Process Rate for Individual Post-Process Tool
i,j=1, 2, 3 . . . .

14. A system for managing within a fabrication facility a work-in-process (WIP) workload comprising:
a fabrication facility comprising:
a minimum of one chemical mechanical polish (CMP) planarizing apparatus pre-process tool, which in turn provides an available work-in-process (WIP) pre-process rate;
a minimum of one recirculating deionized water tank buffer tool, which in turn provides an available work-in-process (WIP) buffer capacity; and
a minimum of one substrate scrubbing apparatus post-process tool, which in turn provides an available work-in-process (WIP) post-process rate, wherein a work in process (WIP) workload within the fabrication facility is sequentially pre-processed within the minimum of one pre-process tool, buffered as needed within the minimum of one buffer tool pending availability of the minimum of one post-process tool, and then post processed within the minimum of one post-process tool; and
a computing means having programmed therein an algorithm for determining for the fabrication facility a buffer tool tolerance time predicated upon the available work-in-process (WIP) pre-process rate, the available work-in-process (WIP) buffer capacity and the available work-in-process (WIP) post process rate, beyond which buffer tool tolerance time the available work-in-process (WIP) buffer capacity is exceeded when operating the fabrication facility.

\* \* \* \* \*